(12) United States Patent
Zeise

(10) Patent No.: US 6,811,511 B2
(45) Date of Patent: Nov. 2, 2004

(54) GEARWHEEL PAIRING AND ITS USE

(75) Inventor: Dirk Zeise, Kassel (DE)

(73) Assignee: DaimlerChrysler AG, Stuttgart (DE)

( * ) Notice: Subject to any disclaimer, the term of this patent is extended or adjusted under 35 U.S.C. 154(b) by 24 days.

(21) Appl. No.: 10/254,067

(22) Filed: Sep. 24, 2002

(65) Prior Publication Data

US 2003/0060319 A1 Mar. 27, 2003

(30) Foreign Application Priority Data

Sep. 27, 2001 (DE) .......................................... 101 47 681

(51) Int. Cl.$^7$ .............................................. F16H 1/28
(52) U.S. Cl. ..................... 475/248; 475/336; 74/421 R; 74/423; 74/417
(58) Field of Search ................................ 475/220, 298, 475/336; 74/416, 417, 421 R, 423, 424, 431, 434

(56) References Cited

U.S. PATENT DOCUMENTS

| | | | | |
|---|---|---|---|---|
| 2,270,567 A | * | 1/1942 | Slider .......................... | 475/251 |
| 2,569,533 A | * | 10/1951 | Morgan ........................ | 475/233 |
| 2,774,253 A | * | 12/1956 | Minard et al. ............... | 475/245 |
| 2,924,998 A | * | 2/1960 | Sem et al. .................... | 475/336 |
| 3,010,336 A | * | 11/1961 | Adair et al. ................. | 74/424.5 |
| 3,253,483 A | * | 5/1966 | McCaw et al. .............. | 475/226 |
| 4,296,654 A | * | 10/1981 | Mercer ......................... | 74/417 |
| 5,472,385 A | * | 12/1995 | Vu ............................... | 475/251 |
| 5,509,862 A | * | 4/1996 | Sherman ...................... | 475/230 |
| 6,080,076 A | * | 6/2000 | Kwoka et al. ............... | 475/248 |

FOREIGN PATENT DOCUMENTS

| | | |
|---|---|---|
| DE | 737 296 | 6/1943 |
| DE | 35 30 190 | 3/1987 |
| DE | 195 36 800 | 4/1996 |
| DE | 100 18 329 | 11/2000 |
| WO | WO 92/01877 | 2/1992 |

\* cited by examiner

*Primary Examiner*—Rodney H. Bonck
*Assistant Examiner*—Eric M. Williams
(74) *Attorney, Agent, or Firm*—Klaus J. Bach

(57) ABSTRACT

In a gearwheel pairing, in which one of a pair of gearwheels has, at least at one side thereof a lid-shaped stop structure for engaging the other gearwheel for retaining it in engagement with the other gear wheel. The arrangement is expediently used in a differential transmission in particular a crown-wheel differential transmission.

9 Claims, 5 Drawing Sheets

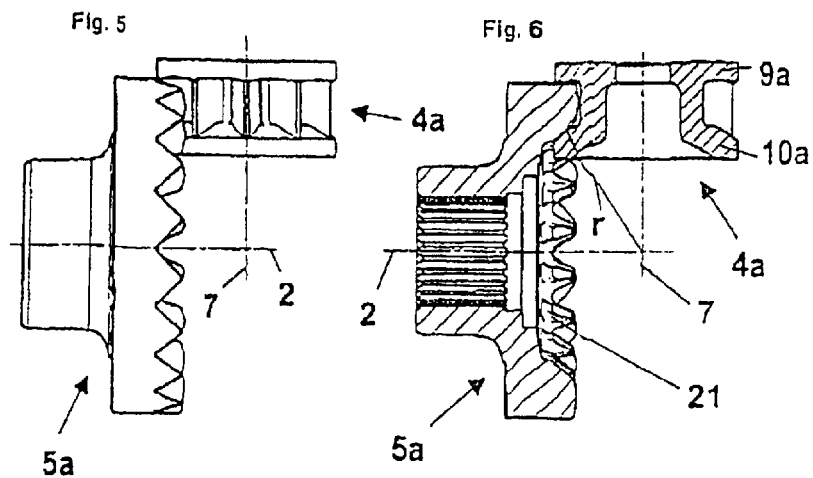
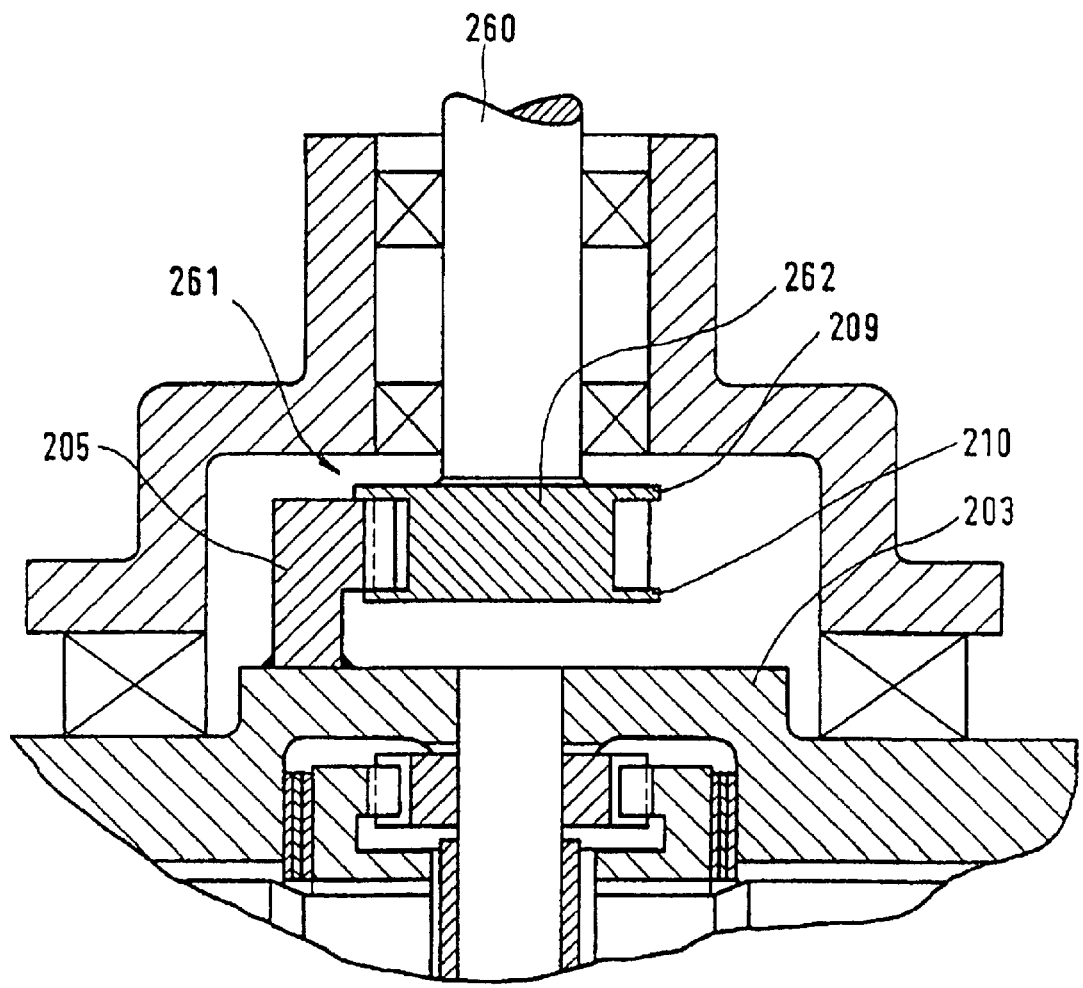

GEARWHEEL PAIRING AND ITS USE

BACKGROUND OF THE INVENTION

The invention relates to a gearwheel pairing and, to its use for a differential transmission.

WO 92/01877 already discloses a gearwheel pairing which is used in a crown-wheel differential. The gearwheel pairing comprises a crown wheel and a spur wheel meshing with the latter. The spur wheel is supported by the casing in the direction outwards from the crown-wheel differential and on a sleeve of the differential bolt in the inward direction so that meshing engagement between the crown wheel and the spur wheel is always ensured.

Furthermore, DE 195 36 800 A1 shows a rear-axle transmission, in which the drive includes a pinion shaft with a spur wheel gear driving the differential casing.

The object of the invention is to provide a gearwheel pairing comprising at least two gearwheels, in particular for a differential, wherein the gearwheel pairing requires a relatively small number of components for ensuring engagement of the teeth of the gears.

SUMMARY OF THE INVENTION

In a gearwheel pairing, one of the gearwheels has, at least at one side thereof, a lid-shaped stop structure for engaging the other gearwheel for retaining the gear wheels in engagement with one another. The arrangement is expediently used in a differential transmission in particular a crown-wheel differential transmission.

One advantage of the invention is that a displacement of the second gearwheel at least in one direction is prevented as a result of a stop structure provided on the second gearwheel. Since the stop structure extends at least between a plurality of teeth, it can be brought into bearing contact with the teeth of the first gearwheel. There is no longer any need for further components in order to support the second gearwheel in this direction.

In a particularly advantageous embodiment of the gearwheel pairing a crown-wheel/spur wheel pairing is provided, with the result that two gearwheels can be arranged at angle of 90° to one another. With the spur wheel being provided with radial teeth, no forces from the first gearwheel are introduced into the stop structure or the second gearwheel. This is advantageous in terms of efficiency and of wear.

If the radial extent of the stop structure corresponds to the tip circle diameter of the teeth, a compact design can be achieved along with the maximum possible support of the second gearwheel with respect to the first gearwheel.

Preferably, there is a second stop structure which extends opposite the axial end of the second gear wheel. In this way, a displacement of the second gearwheel in its two axial directions is prevented by means of the two stop structures in that the respective stop structures bear against the teeth of the first gearwheel in both directions.

With the stop structure firmly connected to, or being part of, the second gear wheel particularly high forces can be transmitted. By virtue of the rotationally fixed connection between the second gearwheel and the stop structure or even by their being integrally formed with one another, a particularly high tooth-root strength is achieved.

Preferably, the first gear wheel is connected to an axle shaft and the second gear wheel is a differential wheel to provide the gearwheel pairing according to the invention for a differential, in particular a crown-wheel differential. In this case, a differential bolt/differential cross may be dispensed with which is a particularly advantageous.

If the differential casing is provided with, or carries, the stop structure, high drive torques can be transmitted through the differential. This is achieved in that the drive torque is not introduced from the casing of the differential into a differential bolt, but into the stop structure, the latter having a disc-shaped design. This disc-shaped design makes it possible to provide a radial mounting in the casing with respect to the geometric axis of the differential wheel. The bearing surface on the casing is large in comparison with a differential bolt, resulting in a correspondingly low surface pressure in spite of high drive torques.

Use in a drive toothing of a differential makes it possible to transmit particularly high drive torques, since the tooth-root strength of the toothing of the gearwheel of the pinion shaft is particularly high.

In an advantageous embodiment, the gearwheel pairing is formed by a crown wheel and a spur wheel. As compared with the conventional hypoid toothings, there are advantages in terms of efficiency and of the bearing load of the pinion shaft.

Further advantages of the invention are obtained if the crown wheel has teeth with inwardly projecting ribs shaped corresponding to the stop structure of the spur wheel.

The invention will be described in greater detail on the basis of the accompanying drawings.

BRIEF DESCRIPTION OF THE DRAWINGS

FIG. 5 shows a gearwheel pairing which is used in a crown-wheel differential according to FIG. 1 to FIG. 4, FIG. 6 shows a gearwheel pairing according to FIG. 5 in a sectional illustration, the section being taken through a plane which is spanned between the axis of rotation of a crown wheel and the geometric axis of a spur wheel meshing with the latter, and FIG. 7 shows a detail of a crown-wheel differential, in which a pinion shaft has a gearwheel with two disc-shaped stop structures.

DESCRIPTION OF PREFERRED EMBODIMENTS

Figure 1:
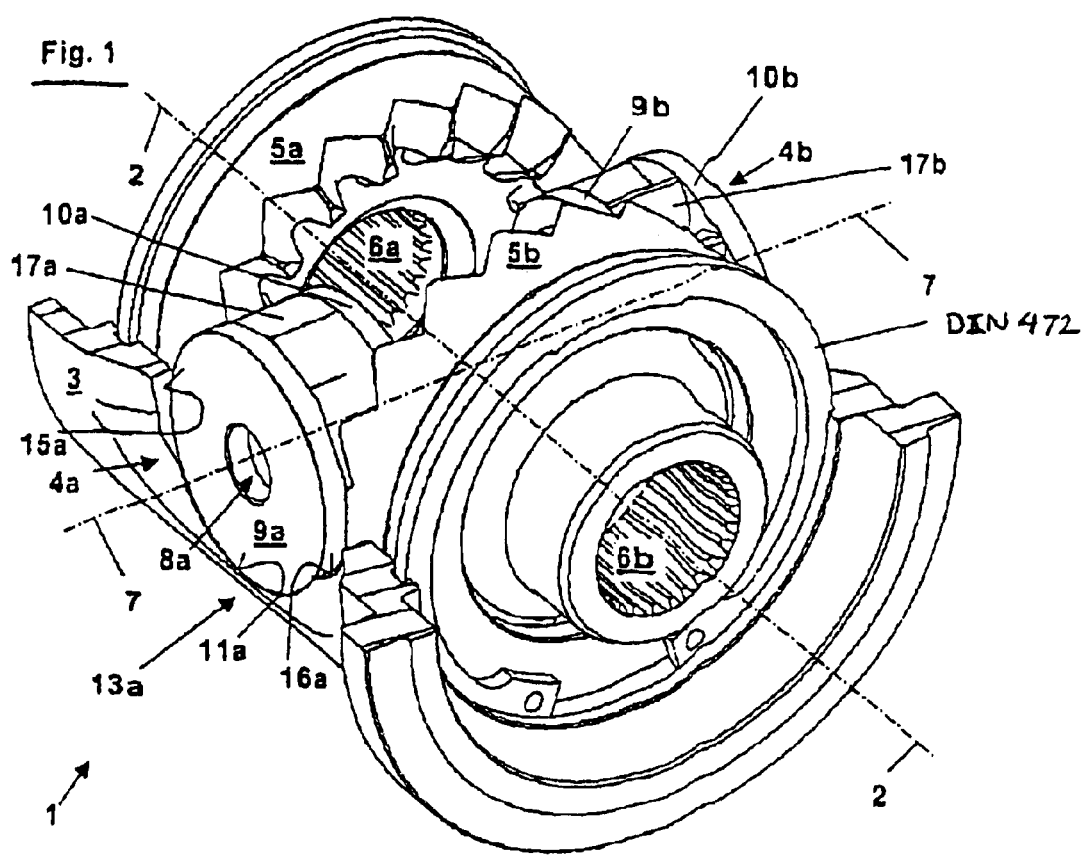
FIG. 1 shows a crown-wheel differential in a sectional perspective illustration.

FIG. 1 shows a crown-wheel differential 1 of a rear-axle transmission in a sectional perspective illustration, the section being taken through a plane which is spanned between an axis of rotation 2 of the crown-wheel differential 1 or of crown wheels 5a, 5b and a geometric axis 7 of differential wheels 4a, 4b.

This crown-wheel differential 1 comprises a cylindrical casing 3, the axis of rotation 2 of which is congruent in the usual way with a geometric axis of axle shafts of the vehicle wheels, which are not shown. The designations "axial" and "radial" used below relate to this geometric axis of rotation 2 if the designations do not refer explicitly to a particular rotationally symmetrical body.

At one axial end, the casing 3 is provided with a ring gear (not shown) for driving the casing in the usual manner.

Figure 3:
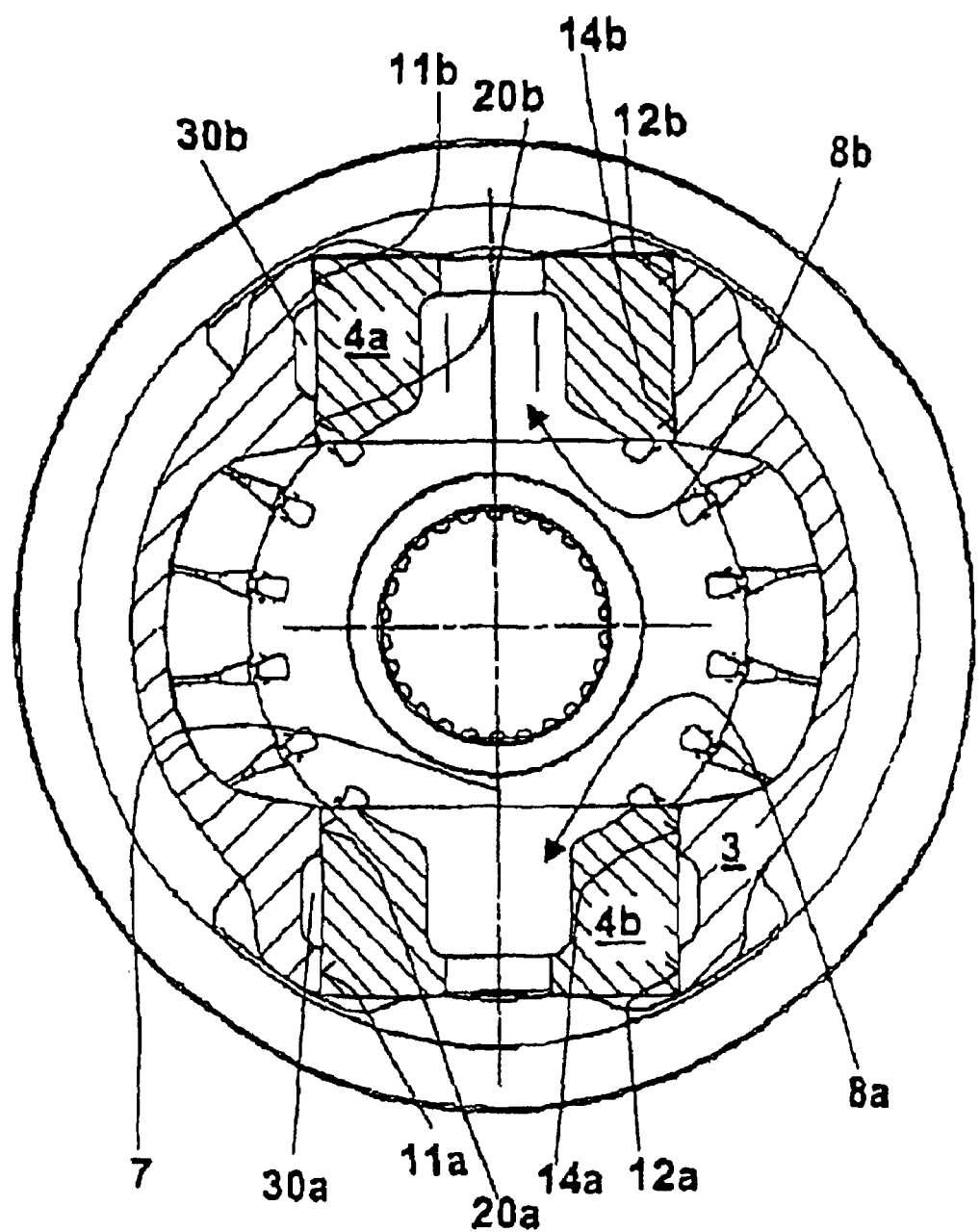
FIG. 3 shows the crown-wheel differential in a section taken along line III—III of FIG. 2.
Figure 4:
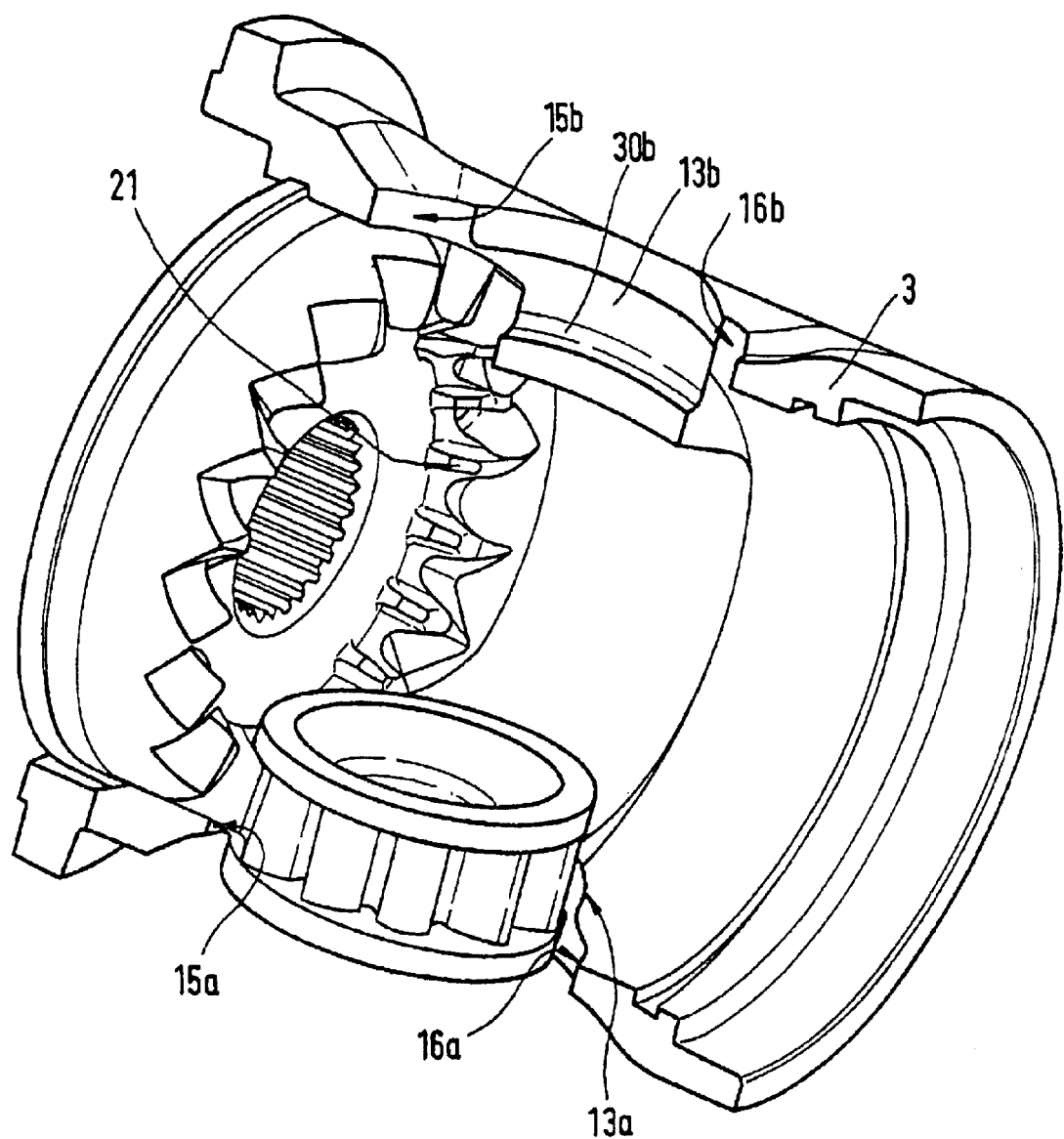
FIG. 4 shows the crown-wheel differential of FIG. 1 to FIG. 3 in a perspective illustration, only one of two spur wheels being illustrated.

The casing 3 has, axially in the center, two diametrically opposite casing recesses 13a, 13b, in which the spur-toothed differential wheels 4a, 4b are radially supported with respect to their geometric axis 7. The casing recess 13b can also be seen in FIG. 4. The differential wheels 4a, 4b have a spur toothing 17a and 17b. The geometric axis 7 is perpendicular to the axis of rotation 2. Arranged centrally in these differential gears 4a, 4b are openings 8a, 8b, of which one opening 8b is indicated in FIG. 3. Each of the two differential wheels 4a and 4b has, with respect to its axis 7, axially on the top side and underside, a disc-shaped stop structured body 9a, 10a, and 9b, 10b, through which the openings 8a, 8b extend. These disc-shaped stop structures 9a, 10a and 9b, 10b are in the form of annular bodies mounted radially in the casing 3 in part-circular the end areas 11a, 12a, 20a, 14a, and 11b, 12b, 20b, 14b of the two casing openings 13a, 13b, of which end areas only one circular end area 11a can be partly seen in FIG. 1. These circular end areas 11a, 12a, 20a, 14a, 11b, 12b, 20b, 14b are disposed circumferentially with respect to the axis of rotation 2, in order to transmit a drive torque from the casing 3 to the differential wheels 4a, 4b over as large an area as possible. The casing openings 13a, 13b have, in the axial direction, edge areas 15a, 15b, 16a, 16b, which are spaced apart from the differential wheels and which ensure the passage of a lubricant and consequently provide for a reliable supply of lubricant for the radial support of the differential wheels 4a, 4b and for tooth engagement. In this tooth engagement, the differential wheels 4a, 4b mesh with the crown wheels 5a, 5b, which are oriented concentrically to the axis of rotation 2 and which receive the axle shafts, not illustrated in any more detail, fixedly in terms of rotation by means of a spline engagement. The crown wheels 5a, 5b are supported, in the direction in which they point away from one another axially, against displacement in relation to the casing 3 by means of an axial ring (DIN 472). Between the respective crown wheel 5a and 5b and its securing ring is arranged in each case a spacer disc for setting the axial distance between the two crown wheels 5a, 5b.

Figure 2:
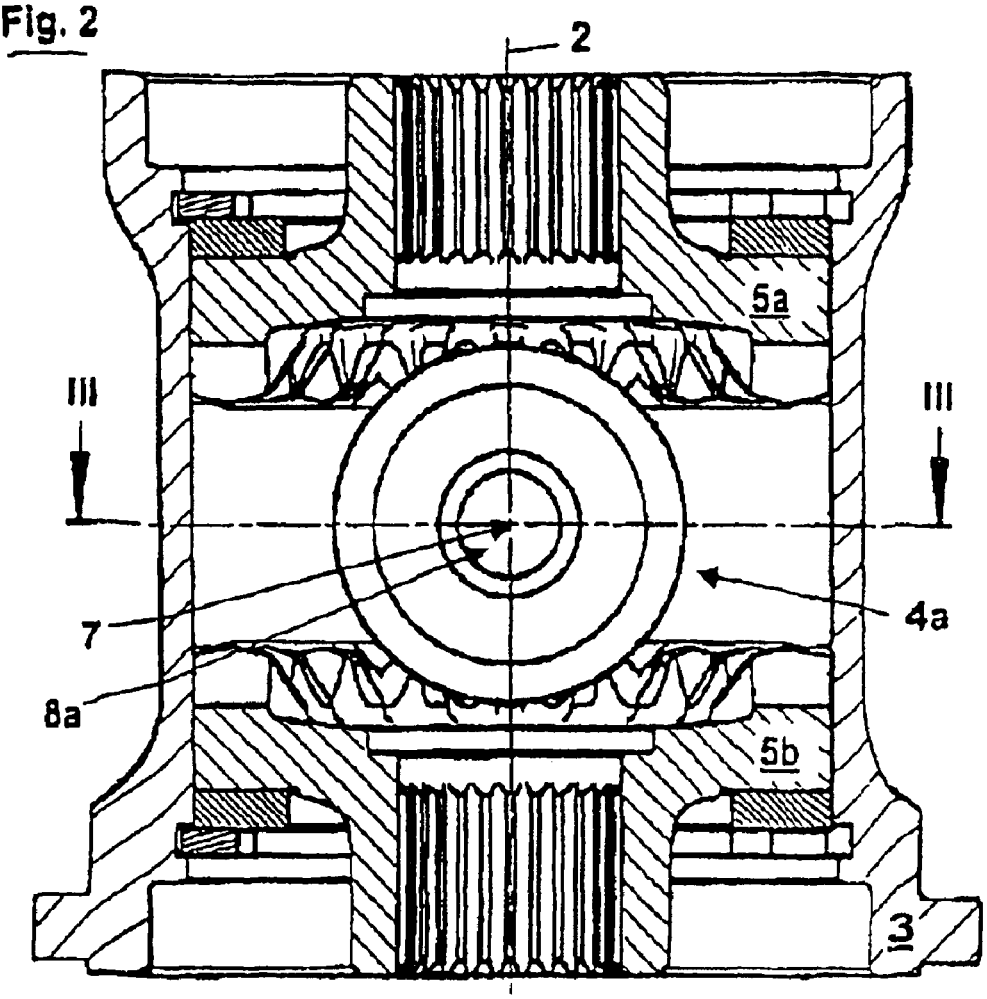
FIG. 2 shows the crown-wheel differential of FIG. 1 in a sectional two-dimensional illustration.

FIG. 2 shows the crown-wheel differential 1 of FIG. 1 in a sectional two-dimensional illustration. The one differential wheel 4a, which lies above the sectional plane, is additionally illustrated.

FIG. 3 shows the crown-wheel differential 1 in a plane section taken along the line III—III of FIG. 2. This plane section III—III is taken perpendicularly to the axis of rotation 2 and contains the axis 7 of the differential wheels 4a, 4b.

The disc-shaped stop structures or bodies 9a or 10a or 9b or 10b in each case bear radially, with respect to the axis 7 of the differential wheels 4a, 4b, on two circular end areas 11a, 12a, or 20a, 14a or 11b, 12b or 20b, 14b of the respective differential casing 3. Between the two circular end areas 11a, 12a or 20a, 14a, or 11b, 12b, or 20b, 14b is an interrupted annular groove 30a, 30b which allows a flow of lubricant through the mutually corresponding spur toothings of the differential wheels 4a, 4b and prevents friction between the spur toothing 17a and 17b and the casing 3. This also reliably ensures lubrication at the toothing between the differential wheels 4a, 4b and the crown wheels 5a, 5b.

Furthermore, in FIG. 3 the openings 8a, 8b of the differential wheels 4a, 4b can be seen, the openings having a varying diameter. The diameter of the two openings 8a, 8b in this case increases radially inwards.

To mount the crown-wheel differential 1, the two differential wheels 4a, 4b are inserted from outside into the casing openings 13a, 13b. Subsequently, the two crown wheels 5a, 5b are inserted into the casing 3 and, followed by the installation of the spacer discs, they are secured by means of DIN 472 spring securing rings.

FIG. 5 shows a gearwheel pairing which is used in a crown-wheel differential 1 according to FIG. 1 to FIG. 4. This gearwheel pairing shows one of the differential wheels 4a and one of the crown wheels 5a meshing with the differential wheel 4a.

FIG. 6 shows the gearwheel pairing according to FIG. 5 in a sectional illustration, the section being taken along a plane which is spanned between the axis of rotation 2 and the axis 7.

The top disc-shaped stop structure 9a of the differential gear 4a can be brought with its underside to bear on the outer cylindrical surface of the crown wheel 5a. By contrast, the lower disc-shaped stop structure 10a of the differential gear 4a can be brought with its topside to bear on the inner surface of the crown-wheel toothing. In this arrangement, each tooth of the crown-wheel toothing has a rib 21 extending radially inwards. These ribs 21 have spherical concave surface areas, which roll on correspondingly spherical convex surfaces areas of the lower disc-shaped stop structure 10a. These spherical convex surfaces are disposed in tooth interspaces of the disc-shaped stop structures 10a. The spherical convex or spherical concave surface has a radius r to the point of intersection of the axis of rotation 2 with the axis 7.

In the normal driving mode of a vehicle, in which the crown-wheel differential 1 is installed, a centrifugal force acts on the differential wheel 4a as a result of rotation about the axis of rotation 2. By virtue of this centrifugal force, the lower disc-shaped stop structure 10a bears on the crown wheel 5a, whereas the top disc-shaped stop structure 9a has play in relation to the crown wheel 5a.

FIG. 7 shows, as a detail, a crown-wheel differential, in which a pinion shaft 260 has a gearwheel 262 with two disc-shaped stop structures 209, 120. The gearwheel 262, together with a crown wheel 205 connected fixedly to a casing 203 of the crown-wheel differential, forms a drive toothing 261.

The two disc-shaped stop structures 209, 210 are formed as integral parts of the gearwheel 262.

The use of the gearwheel pairing for a differential is not restricted to crown-wheel differentials for rear-axle transmissions. Thus, differentials for front-axle transmissions and longitudinal differentials may also be envisaged.

To act as a stop, the stop structure does not necessarily have to be rotationally fixed with respect to the toothing of the differential wheel. Thus, to make it easier to machine the spur toothing of the differential wheel, for example, a disc may be provided, which is arranged fixedly in terms of rotation or rotatably on a basic gear body. In this case, discs may be disposed at opposite sides of the basic gear body and attached by means of a central screw connection or by riveting. Furthermore, it is possible for the discs to be adhesively bonded to the basic gear body in a rotationally-fixed manner.

On the assumption of appropriate lubrication, a helical toothing may be used instead of a spur toothing. The forces as a result of the helical toothing, which endeavor to push the differential wheel inwards, or outwards, are in this case supported by the stop structures.

To make mounting easier, the casing of the crown-wheel differential may have attached to it a stop or step which prevents the differential wheels from falling into the casing after being installed in the casing, but before the installation of the crown wheels.

The embodiments described are merely illustrative designs. A combination of the described features for different embodiments is possible.

What is claimed is:

1. A gearwheel pairing, which comprises a crown gearwheel with axial teeth having radially inner and outer axially extending annular surface areas and a spur gearwheel with radial teeth, the spur gearwheel including spaced first and second annular stop structures disposed at axially opposite sides of the radial teeth of said spur gear wheel and having opposite face areas engaging therebetween the radially inner and outer annular surface areas of the teeth of the crown gearwheel.

2. A gearwheel pairing according to claim 1, wherein said axial annular stop structures extend at least to the tip circle diameter of said teeth.

3. A gearwheel pairing according to claim 1, wherein said first and second axial annular stop structures are an integral part of said spur gearwheel.

4. A gearwheel pairing according to claim 1, wherein said crown wheel is provided at its teeth with inwardly extending ribs with surface areas corresponding to the fact area of the respective annular stop structure of the spur wheel by which the ribs are engaged.

5. A differential transmission with a gearwheel pairing according to claim 1, wherein said crown gearwheel is connected to an axle shaft and said spur gearwheel is a differential gear.

6. A differential transmission according to claim 5, including a casing with a given axis oil rotation, wherein said axial annular stop structure is disc-shaped and is supported on the casing circumferentially in radial direction about said given axis of rotation.

7. A differential transmission according to claim 6, wherein said teeth of said crown gearwheel are provided with ribs having surface areas corresponding to the face area of the axial annular stop structure of the differential spur gearwheel by which the ribs are engaged.

8. A differential transmission according to claim 7, wherein said casing is provided with a another crown gear for rotation with said casing and a pinion shaft carries a spur gearwheel for rotation therewith, said spur gearwheel being provided with at least one axial stop structure engaging said crown gear wheel.

9. A differential transmission according to claim 8, wherein said casing has an axis of rotation for a drive shaft and an opening along said axis of rotation large enough to permit insertion of the differential spur gearwheels and also the crown gear wheels into the casing from the outside thereof, said atop structures provided on said spur gearwheels having circumferential surface areas by which said spur gear wheels are rotationally supported in spur gear wheel openings of said casing.

* * * * *